United States Patent [19]

Baum et al.

[11] 3,715,673

[45] Feb. 6, 1973

[54] NOISE SUPPRESSION FOR COMMUNICATION CABLES

[75] Inventors: Walter Baum, Nurnberg; Michael Still, Langenhagen, both of Germany

[73] Assignee: Baum Electrophysik GmbH, Nurnberg, Germany

[22] Filed: Feb. 17, 1971

[21] Appl. No.: 116,182

[30] Foreign Application Priority Data

Feb. 19, 1970 Germany....................P 20 07 641.9

[52] U.S. Cl.....................328/165, 333/12, 178/69 B

[51] Int. Cl...............................................H04b 3/28

[58] Field of Search...333/12; 330/149; 328/165, 62; 179/170 E; 178/69, 69 B

[56] References Cited

UNITED STATES PATENTS

| | | | |
|---|---|---|---|
| 1,773,772 | 8/1930 | Berthold | 333/12 |
| 2,758,286 | 8/1956 | Wible | 333/12 |
| 3,518,577 | 6/1970 | Baum | 333/12 |
| 3,418,603 | 12/1968 | Alexandre | 333/12 |
| 955,142 | 4/1910 | Davis | 333/12 |

*Primary Examiner*—Herman Karl Saalbach
*Assistant Examiner*—Marvin Nussbaum
*Attorney*—Philip G. Hilbert

[57] ABSTRACT

Noise developed along the sheath (or shield) of a communications cable, is bucked out by means of an amplifier-transformer combination located in proximity to the terminal facility which receives a cable. The bucking voltage is applied to the sheath itself. The sheath itself may be wound so as to constitutes the secondary winding of the transformer.

11 Claims, 2 Drawing Figures

PATENTED FEB 6 1973

3,715,673

INVENTORS
Walter Baum
Michael Still

BY Philip S. Hilbert

ATTORNEY

NOISE SUPPRESSION FOR COMMUNICATION CABLES

This invention relates to suppression of electrical noise in an electrical communications cable. Such noise is often attributable to so called "ground currents" in the shield or sheath or mantle of the cable, or in a "ground return" wire of the cable, i.e. the wire which serves as a return path for the communication currents carried "forward" by the internal conductors of the cable. The ground return wire is maintained at the shield's nominal ground potential, theoretically a uniform potential which exists along the full length of the shield and of the ground return wire.

More particularly, the present is directed to the suppression of such noise in the terminal facility into which the cable is brought. Such a terminal facility may be a telephone or telecommunication central station or switching substation or repeater station, or a so-called "fanning-strip" at which the single or plural individual internal conductors of the cable are brought out for example to binding posts, for connection at these binding posts to therefrom outgoing conductors, or more generally a facility at which these internal conductors are brought out from the cable.

In communication cable arrangements, it has been common practice to enclose the internal, communication-current carrying conductors with a metallic shield, which may assume the form of a solid tubular "mantle" or "sheath", or which may be in the form of interleaved groups of strands of wires. The shield is electrically connected to "ground", that is to earth, or to a local "chassis-ground" or local "bus-bar ground" at one point at least, and commonly at several points which are spaced apart along the cable length. The shield serves for suppression of electrical noise induced by sources external to the cable; it may also serve to protect the internal conductors in a mechanical sense, for example to permit the shield rather than the mechanically weaker internal conductors, to take up stresses due to suspension or bending of the cable. The shield may also serve to protect the internal conductors from adverse environmental conditions.

In some applications, the shield or separate associated ground return wire may serve an additional electrical purpose besides electrical shielding from external sources, namely as a common return path for the several internal conductors carrying "forward" communication currents internally of the sheath. Alternatively, instead of a single such ground return wire, several of them may be assigned respectively to groups of internal conductors.

Whether the electrical function is to shield, or to serve as a return path, the shield or sheath or mantle or ground return wire have one thing in common, namely that they are maintained at ground potential or otherwise "neutral" potential. For purposes of the present invention, there is one more type of metallic wire which is to be embraced within the generic concept of "-neutral potential conductor", namely the so called "guy wire" or suspension wire, to which the cable may be tied mechanically for purposes of support, the guy wire or suspension wire carrying the brunt of mechanical stresses.

In theory, the neutral potential conductor should be a perfect conductor and its potential should be uniform along the full length of the cable, namely earth potential. As a practical matter, such a conductor is not a perfect conductor, nor is its potential uniform along its length at earth potential. The neutral potential conductor has small but finite distributed resistance along its length, also distributed capacitance with respect to earth and with respect to other cables and with respect to power lines; it may be inductively coupled to other cables and to power lines, to the tracks of electrically operated railways or to their over-head cables, etc., the inductive coupling being also possibly in a distributed manner along the cable length. The fact that resistance, capacitance and inductance is distributed along its length, implies that when a current flows through the neutral potential conductor, there will exist a potential difference between points on that conductor which are spaced apart. When the cable length is quite long, as may be the case for many communications cables, there exists quite an appreciable and troublesome potential difference between a point which is remote from the terminal facility and the terminal facility itself, that potential difference changing progressively on the neutral potential conductor along its length.

An appreciable potential difference along the length of the neutral potential conductor usually manifests itself as electrical noise, which may be so severe as to obliterate the desired communication signal. The sources of the noise currents which flow along the length of the neutral potential conductor, and which is consequence generates the noise potential, are of many types; only a few will be listed here: Return currents of several internal conductors—these result in "cross-talk"; return currents of another communication cable or of a power line which accidentally comes into electrical contact with the neutral potential conductor in question; conductive, inductive or capacitive coupling to other communications cables or power lines, or to electrical railway or subway tracks or overhead lines; lightning discharge currents. For communication circuits serviced by cable as contemplated by the present invention, the most troublesome sources of noise are those which produce noise in the audio sprectrum, for example sources which operate at power line frequences (60 Hz. in the United States, 16 or 50 Hz. in many European countries); even 400 Hz. is used as power line frequency in some applications. Noise generators operating at even supersonic frequencies can prove very troublesome, since invariably the supersonic frequency may be modulated by a sonic frequency signal, which will eventually be demodulated and constitutes a sonic frequency noise.

The problem of noise generation in the neutral potential conductor of communication cables has been recognized before, and suppression schemes have been devised. These schemes have had for their goal the suppression of the noise virtually along the full length of the neutral potential conductor, a goal which cannot even be approached in practice. These schemes have included judicious selection of the points at which the neutral potential conductor is earthed; twisting of strands of the shielding wire; internal twisted conductor pairs. The present invention does not necessarily reject these prior approaches, but does not place principal reliance on them, since they cannot by themselves approach the degree of the virtual elimination of noise which is achievable by the approach of the present invention.

It is therefore an object of the invention to eliminate at the terminal facility, virtually all noise develope along the length of a neutral potential conductor.

Another object of the invention is the provision of such a noise elimination scheme, which can be readily and economically integrated into existing cable networks without disturbing their service and without the necessity to replace the existing cables by new ones, a replacement which would be very expensive.

The present invention,recognizing that it is virtually impossible to eliminate noise along the full length of a neutral potential conductor, instead seeks the virtual elimination of the noise at the point where such elimination is most important, namely right at or near the terminal facility. This is accomplished, in accordance with the invention, by generation of a bucking potential, equal in magnitude and frequency characteristics to the noise voltage existing near the terminal facility, but phase reversed with respect thereto, and introducing the bucking potential into the neutral potential conductor right at or near the terminal facility, so as to cancel out the noise potential in that conductor.

The invention will be better understood from a reading of the following, more detailed description, of which the appended claims for a part, when considered together with the accompanying drawings, in which:

Figure 1:
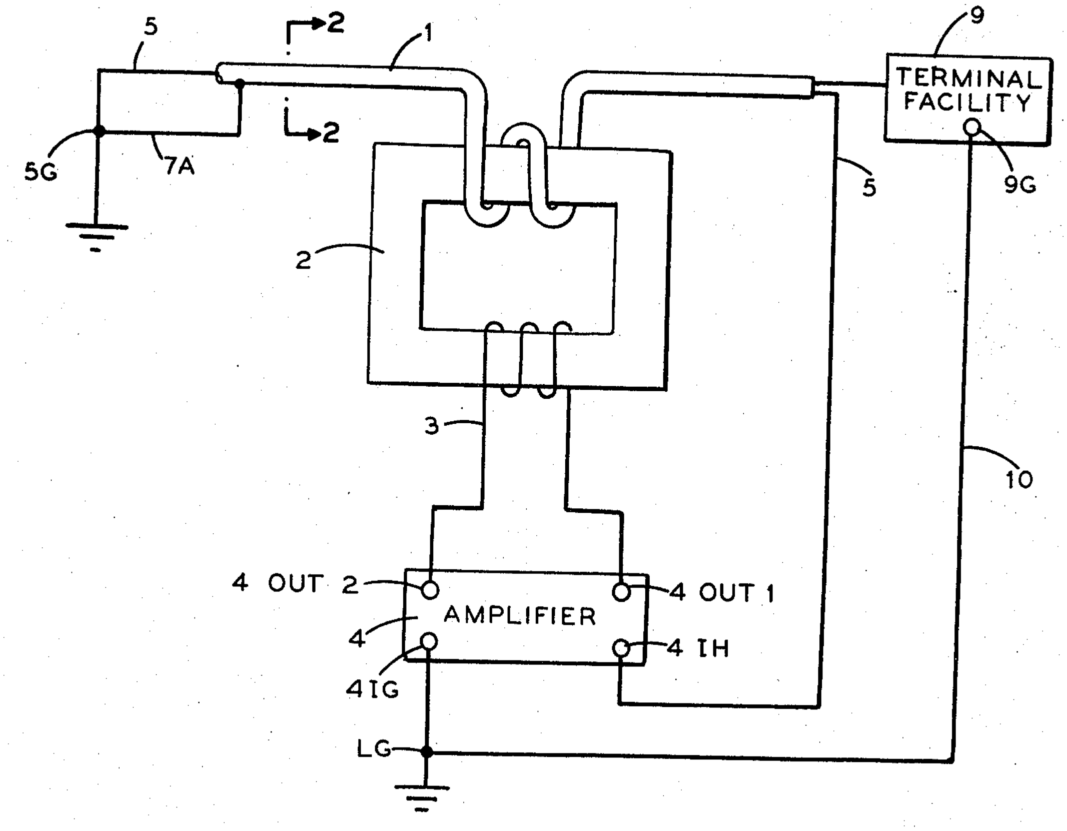
FIG. 1 is a schematic drawing of a preferred embodiment of the invention.
Figure 2:
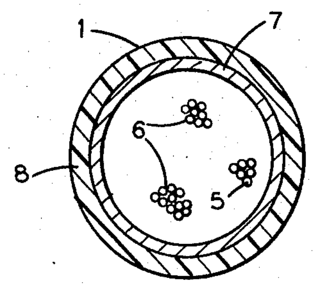
FIG. 2 is a cross-sectional view of a communications cable to which the arrangement of FIG. 1 may be applied.

Referring to FIG. 1,there is shown a communications cable 1 which leads into the terminal facility 9. Referring to FIG. 2, the cable 1 is shown by way of example, progressing radially inward,an outer mantle (rubber or plastic), an inner mantle 7 made of lead, a number of interior conductors 6 each formed as a quadruplet of wires. The conductors 6 may be deemed to serve as communication current conductors (in the previous sense). The neutral potential conductor 5 is shown here by way of example as another internal quadruplet conductor 5, although in another situation, the lead mantle itself might serve that function.

Referring again to FIG. 1, the neutral potential conductor 5 is grounded at a remote point 5G. The lead mantle 7 is also grounded at a convenient point, and more specifically as shown in FIG. 1 also at 5G by means of wire 7*a*. Near the terminal facility 9, neutral potential conductor 5 is connected to the "hot" input 4IH of an amplifier 4, whose ground input terminal 4IG is connected to a local ground point LG. The amplifier 4 is a wide-band amplifier, suitable for amplification of audio frequencies from a few cycles per second to perhaps 20 Hz. An amplifier suitable to be used virtually "as is" for purposes of the amplifier 4, is Radio Corporation of America amplifier type CA3020, which is described in "Technical Series IC–41" published by the Radio Corporation of America , reference being particularly to FIG. 249 of that publication.

The output terminals 4OUTI and 4OUT2 of the amplifier are respectively connected to the ends of a primary winding 3 of an iron core transformer 2.

The secondary winding of the transformer 2 is comprised of turns of the cable 1 itself; inductive coupling is into the mantle 7. The ground terminal 9G is connected via line 10 to the local ground point LG.

The overall gain and phase characteristics of the combination of amplifier 4 and transformer 2, from input terminal 4IH across the secondary of the transformer 2, are selected to be respectively unity gain and 180° degree phase reversal. The consequence of such a gain-phase characteristic is to buckout virtually completely, any noise potential which would develop on the mantle 7 near the terminal facility 9 in the absence of provision of the combination of amplifier 4 and transformer 2. In this manner, virtually complete noise elimination may be achieved where it is most necessary and desirable, namely at the terminal facility.

The invention contemplates various modifications of the arrangements just described. In many applications, experience indicates that the most troublesome noise occurrs at power line frequencies. In such case, the amplifier 4 need not be given such a wide frequency response so as to encompass the entire audio range, and a band pass amplifier having a narrow response centered about the power line frequency, would be sufficient.

In some applications, it may turn out that the cable 1 is too bulky for purposes of winding it so as to form a secondary winding for the transformer 2. In such case, the secondary winding may be comprised of more conventional transformer-winding-wire, one end of such secondary being joined to the mantle 7 electrically near the terminal facility 9. Alternatively, an associated guy wire (not shown), a ground return wire, or even the conductor 5 itself may serve to provide the transformer secondary winding wire.

What is claimed is:

1. A communications device comprising, in combination, a communications cable having first and second ends, said first end being adapted for connection to signal sources, a terminal facility, said second end being connected to said terminal facility, said cable comprising at least one signal communications conductor for transferring communications signals, at least one neutral potential conductor coextensive therewith, means for connecting the end of said neutral potential conductor adjacent said signal sources to ground, and a conductive sheath at least shielding said signal communications conductor, a signal amplifier having an input side and an output side, means for connecting the input side of said amplifier to the end of said neutral potential conductor adjacent said second end of said communications cable connected to said terminal facility, a transformer having a primary winding connected to the output side of said amplifier and a secondary winding electromagnetically coupled to the end of said signal conductor adjacent said secondend of said communications cable connected to said terminal facility, the phasing of said signal amplifier and the winding sense of said secondary winding being such as to cause the bucking out of noise potentials at the input of said terminal facility.

2. A communications device as claimed in claim 1, wherein a portion of the cable itself is wound about the transformer so that the thereto related portion of said sheath constitutes the secondary winding of the transformer.

3. A communications device as claimed in claim 1, wherein said sheath and said neutral potential conductor of the cable are maintained at a nominal neutral potential.

4. A communications device as claimed in claim 3, wherein said neutral potential conductor which is maintained at the nominal neutral potential, is grounded remotely from the terminal facility and, the signal amplifier is grounded locally.

5. A communications device as claimed in claim 1, wherein said signal amplifier is a wide-band amplifier capable of amplifying substantially the entire audio frequency spectrum.

6. A communications device as claimed in claim 1, wherein said signal amplifier is a band-pass amplifier capable of amplifying a relatively narrow frequency band centered about a power line frequency.

7. A communications device as claimed in claim 3, wherein a portion of said neutral potential conductor which is maintained at nominal neutral potential, is wound about said transformer so that the last-mentioned portion constitutes said secondary winding of the transformer.

8. A communications device as claimed in claim 1, wherein said neutral potential conductor is an internal "ground-return" conductor which is maintained at the nominal neutral potential, a portion of said "ground-return" conductor being wound about said transformer so that the last-mentioned portion constitutes the secondary winding of said transformer.

9. A communications devices as claimed in claim 1, wherein said cable is provided with an external mechanically supporting conductor which is maintained at the nominal neutral potential, a portion of the last-mentioned conductor being wound about said transformer so that the last-mentioned portion constitutes the secondary winding of said transformer.

10. A communications device as claimed in claim 1, wherein said transformer secondary winding is electrically connected to the shield of the cable in proximity to said terminal facility.

11. A communications device as claimed in claim 1 wherein the gain and phase characteristics of the amplifier-transformer combination, from: amplifier input, to: across the secondary winding, are unity gain and phase reversal.

* * * * *